US012520876B2

(12) United States Patent
White et al.

(10) Patent No.: US 12,520,876 B2
(45) Date of Patent: Jan. 13, 2026

(54) AEROSOL GENERATING APPARATUS AND METHOD OF OPERATING SAME (71) Applicant: Nicoventures Trading Limited, London (GB)

(72) Inventors: Julian Darryn White, Cambridgeshire (GB); Martin Daniel Horrod, Cambridgeshire (GB)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 18/732,950

(22) Filed: Jun. 4, 2024

(65) Prior Publication Data

US 2024/0324684 A1 Oct. 3, 2024

Related U.S. Application Data (63) Continuation of application No. 17/309,417, filed as application No. PCT/EP2019/084600 on Dec. 11, 2019, now Pat. No. 12,029,250.

(30) Foreign Application Priority Data

Dec. 11, 2018 (GB) ..................................... 1820143

(51) Int. Cl.
A24F 40/465 (2020.01)
A24B 15/14 (2006.01)
(Continued)

(52) U.S. Cl.
CPC ............ A24F 40/465 (2020.01); A24B 15/14 (2013.01); H05B 6/06 (2013.01); H05B 6/108 (2013.01)

(58) Field of Classification Search
None
See application file for complete search history.

(56) References Cited

U.S. PATENT DOCUMENTS 11,516,893 B2 * 11/2022 Rossoll ................. H05B 6/105
11,793,239 B2 * 10/2023 Courbat ................. A24F 40/50
(Continued)

FOREIGN PATENT DOCUMENTS

| WO | 2015177264 A1 | 11/2015 |
| WO | 2018178113 A2 | 10/2018 |
| WO | 2018178216 A1 | 10/2018 |

OTHER PUBLICATIONS

International Search Report and Written Opinion of International Application No. PCT/EP2019/084600, mailed on Mar. 25, 2020.

Primary Examiner — Ross N Gushi
(74) Attorney, Agent, or Firm — BURR & FORMAN (57) ABSTRACT An aerosol generating apparatus has a composite susceptor for heating an aerosol generating material in use thereby to generate an aerosol. The composite susceptor comprises a support portion and a susceptor portion supported by the support portion. The apparatus comprises an induction element arranged for inductive energy transfer to the susceptor portion in use; and a driving arrangement arranged to drive the induction element with an alternating current in use thereby to cause the inductive energy transfer to the susceptor portion, thereby to cause the heating of the aerosol generating material by the composite susceptor, thereby to generate the aerosol. The alternating current has a waveform comprising a fundamental frequency component having a first frequency and one or more further frequency components each having a frequency higher than the first frequency. A method of operating the aerosol generating apparatus is also disclosed.

17 Claims, 5 Drawing Sheets (51) Int. Cl.
*H05B 6/06* (2006.01)
*H05B 6/10* (2006.01)

(56) References Cited

U.S. PATENT DOCUMENTS

| | | |
|---|---|---|
| 2016/0295921 A1 | 10/2016 | Mironov |
| 2018/0192701 A1 | 7/2018 | Stoner et al. |
| 2022/0256915 A1 | 8/2022 | Rossoll |
| 2022/0361558 A1* | 11/2022 | Rojo-Calderon ...... A24D 1/002 |
| 2023/0096283 A1 | 3/2023 | Courbat |

* cited by examiner

FIG 6j driving an inducting element with an alternating current having a waveform comprising a fundamental frequency component having a first frequency and one or more further frequency components each having a frequency higher than the first frequency

AEROSOL GENERATING APPARATUS AND METHOD OF OPERATING SAME

PRIORITY CLAIM

The present application is a continuation application of U.S. application Ser. No. 17/309,417 filed on May 26, 2021, which is a National Phase entry of PCT Application No. PCT/EP2019/084600, filed Dec. 11, 2019, which claims priority from Great Britain Application No. 1820143.4, filed Dec. 11, 2018, each of which is hereby fully incorporated herein by reference.

TECHNICAL FIELD

The present invention relates an aerosol generating apparatus and a method of operating same.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present invention, there is provided an aerosol generating apparatus comprising: a composite susceptor for heating an aerosol generating material in use thereby to generate an aerosol in use, wherein the composite susceptor comprises a support portion and a susceptor portion supported by the support portion; an induction element arranged for inductive energy transfer to the susceptor portion in use; and a driving arrangement arranged to drive the induction element with an alternating current in use thereby to cause the inductive energy transfer to the susceptor portion in use, thereby to cause the heating of the aerosol generating material by the composite susceptor in use, thereby to generate the aerosol in use; wherein the alternating current has a waveform comprising a fundamental frequency component having a first frequency and one or more further frequency components each having a frequency higher than the first frequency.

Optionally, the susceptor portion is formed as a coating on the support portion.

Optionally, the susceptor portion comprises a first sheet of material and the support portion comprises a second sheet of material configured to abut the susceptor portion to support the susceptor portion.

Optionally, the support portion is configured to surround the susceptor portion.

Optionally, the susceptor portion has a thickness of substantially no more than 50 microns.

Optionally the susceptor has a thickness of substantially no more than 20 microns.

Optionally, the susceptor portion comprises a ferromagnetic material.

Optionally, the susceptor portion comprises one or more of nickel and cobalt.

Optionally, the one or more further components are harmonics of the fundamental component.

Optionally, the first frequency is a frequency F in the range 0.5 MHz to 2.5 MHz, and the frequency of each of the one or more further frequency components is nF, where n is a positive integer greater than 1.

Optionally, the waveform is one of a substantially triangular waveform, a substantially sawtooth waveform, and a substantially square waveform.

Optionally, the waveform is a bi-polar square waveform.

Optionally, the driving arrangement comprises transistors arranged in a H-bridge configuration and controllable to provide the bi-polar square waveform.

Optionally, the support portion comprises one or more of a metal, a metal alloy, a ceramics material, a plastics material, and paper.

Optionally, the composite susceptor comprises a heat resistant protective portion, wherein the susceptor portion is located between the support portion and the protective portion.

Optionally, the heat resistant protective portion is a coating on the susceptor portion.

Optionally, the heat resistant protective portion comprises one or more of a ceramics material, metal nitride, titanium nitride, and diamond.

Optionally, the composite susceptor is substantially planar.

Optionally, the composite susceptor is substantially tubular.

Optionally, the apparatus comprises the aerosol generating material, wherein the aerosol generating material is in thermal contact with the composite susceptor.

Optionally, the aerosol generating material comprises tobacco and/or one or more humectants.

According to a second aspect of the present invention, there is provided a method of operating an aerosol generating apparatus, the aerosol generating apparatus comprising a composite susceptor arranged for heating an aerosol generating material thereby to generate an aerosol, the composite susceptor comprising a support portion and a susceptor portion supported by the support portion; the apparatus further comprising an induction element arranged for inductive energy transfer to the susceptor portion; the method comprising: driving the induction element with an alternating current thereby to cause the inductive energy transfer to the susceptor portion, thereby to cause the heating of the aerosol generating material by the composite susceptor, thereby to generate the aerosol; wherein the alternating current has a waveform comprising a fundamental frequency component having a first frequency and one or more further frequency components each having a frequency higher than the first frequency.

Optionally, the one or more further frequency components are harmonics of the fundamental frequency component.

Optionally, the first frequency is a frequency F in the range 0.5 MHz to 2.5 MHz, and the frequency of each of the one or more further frequency components is nF, where n is a positive integer greater than 1.

Optionally, the waveform is one of a triangular waveform, a sawtooth waveform, and a square waveform.

Optionally, the waveform is a bi-polar square waveform.

Optionally, the aerosol generating apparatus is the aerosol generating apparatus according to the first aspect.

BRIEF DESCRIPTION OF THE DRAWINGS

Further features and advantages will now be described, by way of example only, with reference to the accompanying drawings of which.

DETAILED DESCRIPTION OF THE DRAWINGS

Induction heating is a process of heating an electrically conducting object (or susceptor) by electromagnetic induction. An induction heater may comprise an induction element, such as an electromagnet, and circuitry for passing a varying electric current, such as an alternating electric current, through the electromagnet. The varying electric current in the electromagnet produces a varying magnetic field. The varying magnetic field penetrates a susceptor suitably positioned with respect to the electromagnet, generating eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an RLC circuit, comprising a resistance (R) provided by a resistor, an inductance (L) provided by an induction element, for example the electromagnet which may be arranged to inductively heat a susceptor, and a capacitance (C) provided by a capacitor, for example connected in series or in parallel. In some cases, resistance is provided by the ohmic resistance of parts of the circuit connecting the inductor and the capacitor, and hence the RLC circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other. Resonance occurs in an RLC or LC circuit because the collapsing magnetic field of the inductor generates an electric current in its windings that charges the capacitor, while the discharging capacitor provides an electric current that builds the magnetic field in the inductor. When the circuit is driven at the resonant frequency, the series impedance of the inductor and the capacitor is at a minimum, and circuit current is maximum. Driving the RLC or LC circuit at or near the resonant frequency may therefore provide for effective and/or efficient inductive heating.

Figure 1:
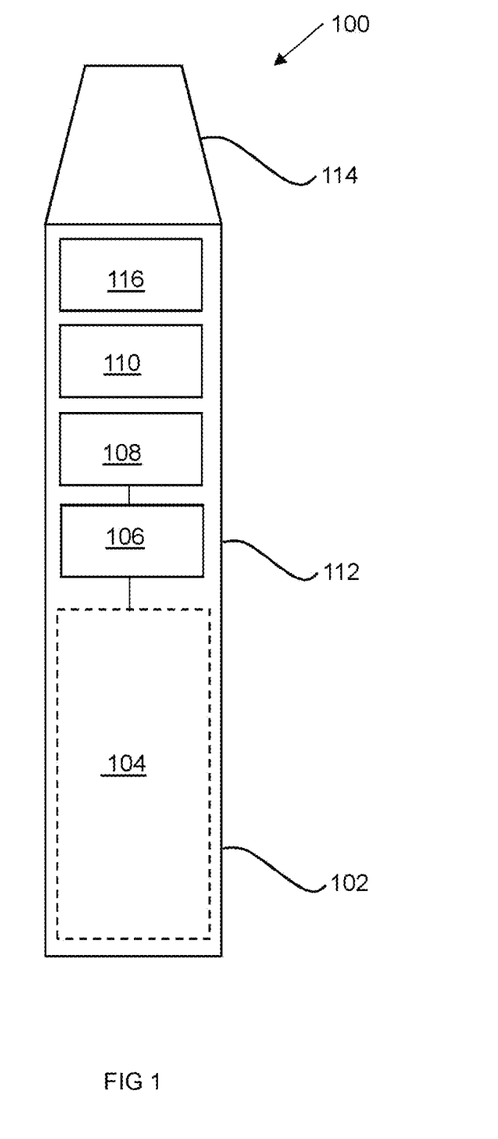
FIG. 1 illustrates schematically an aerosol generating apparatus according to an example.

FIG. 1 illustrates schematically an aerosol generating apparatus 100, according to an example. The apparatus 100 is an aerosol generating device 100. The aerosol generating device 100 is hand held. The aerosol generating device 100 comprises a DC power source 104, in this example a battery 104, a driving arrangement 106, an induction element 108, a composite susceptor 110, and aerosol generating material 116.

In broad overview, the composite susceptor 110 (which comprises a support portion and a susceptor portion supported by the support portion, described in more detail below) is for heating the aerosol generating material in use to generate an aerosol in use, the induction element 108 is arranged for inductive energy transfer to at least the susceptor portion of the composite susceptor 110 in use, and the driving arrangement 106 is arranged to drive the induction element 108 with an alternating current in use thereby to cause the inductive energy transfer to the susceptor portion of the composite susceptor 110 in use, thereby to cause the heating of the aerosol generating material 116 by the composite susceptor 110 in use, thereby to generate the aerosol in use. The alternating current has a waveform comprising a fundamental frequency component having a first frequency and one or more further frequency components each having a frequency higher than the first frequency. For example, the waveform may be a substantially square waveform.

In broad overview, driving the induction element with a current having a waveform comprising a fundamental frequency component and one or more further frequency components of higher frequency, in turn causes the alternating magnetic field produced by the induction element to comprise a fundamental frequency component and one or more further frequency components of higher frequency. The skin depth (i.e. the characteristic depth into which the alternating magnetic field produced by the induction element 108 penetrates into the susceptor portion to cause inductive heating) decreases with increasing frequency of the alternating magnetic field. Therefore, the skin depth for the higher frequency components is less than the skin depth for the fundamental frequency component. Using a waveform comprising the fundamental frequency component and the one or more higher frequency components may therefore allow a greater proportion of the inductive energy transfer from the induction element to the susceptor to occur in relatively small depth from the surface of the susceptor, for example as compared to using the fundamental frequency alone. This may allow the thickness of susceptor portion to be reduced while still substantially maintaining a given energy transfer efficiency, which may in turn allow the cost of the susceptor portion to be reduced (and/or the efficiency of producing the susceptor portion to be increased). Alternatively or additionally, this may allow the energy transfer efficiency to be increased for a given susceptor portion thickness (for example one in which the skin depth might otherwise be larger than the thickness of the susceptor portion), which may in turn allow an improved heating efficiency. An improved aerosol generating device and method for producing an aerosol may therefore be provided.

Returning to FIG. 1, the DC power source 104 is electrically connected to the driving arrangement 106. The DC power source is 104 is arranged to provide DC electrical power to the driving arrangement 106. The driving arrangement 106 is electrically connected to the induction element 108. The driving arrangement 106 is arranged to convert an input DC current from the DC power source 104 into an alternating current. The driving arrangement 106 is arranged to drive the induction element 108 with the alternating current. In other words, the driving arrangement 106 is arranged to drive the alternating current through the induction element 108, that is to cause an alternating current to flow through the induction element 106.

The induction element 108 may be, for example, an electromagnet, for example a coil or solenoid, which may for example be planar, which may for example be formed from copper. The induction element 108 is arranged for inductive energy transfer to the composite susceptor 110 in use (i.e. to at least the susceptor portion of the composite susceptor 110, as described in more detail below). Equally, the composite susceptor 110 is arranged relative to the induction element 108 for inductive energy transfer from the induction element 108 to the composite susceptor 110.

The induction element 108, having alternating current driven therethrough, causes the composite susceptor 110 to heat up by Joule heating and/or by magnetic hysteresis heating, as described above. For example, the composite susceptor 110 is in thermal contact with the aerosol generating material 116 (i.e. arranged to heat the aerosol generating material 116 for example by conduction, convection, and/or radiation heating, to generate an aerosol in use). In some examples, the composite susceptor 110 and the aerosol generating material 116 form an integral unit that may be inserted and/or removed from the aerosol generating device 100 and may be disposable. In some examples, the induction element 108 may be removable from the device 100, for example for replacement. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol and/or propylene glycol.

Returning to FIG. 1, the aerosol generating device 100 comprises an outer body 112 housing the battery 104, the driving arrangement 106, the induction element 108, the composite susceptor 110, and the aerosol generating material 116. The outer body 112 comprises a mouthpiece 114 to allow aerosol generated in use to exit the device 100. In some implementations, however, the aerosol generating material 116 and the mouthpiece 114 may be provided in a combined structure which is inserted into the device 100 (e.g., a paper-wrapped tube of tobacco or tobacco containing material comprising a filter material at one end).

In use, a user may activate, for example via a button (not shown) or a puff detector (not shown) which is known per se, the circuitry 106 to cause alternating current to be driven through the induction element 108, thereby inductively heating the composite susceptor 116, which may in turn heat the aerosol generating material 116, and cause the aerosol generating material 116 thereby to generate an aerosol. The aerosol is generated into air drawn into the device 100 from an air inlet (not shown), and is thereby carried to the mouthpiece 114, where the aerosol exits the device 100.

The driver arrangement 106, induction element 108, composite susceptor 110 and/or the device 100 as a whole may be arranged to heat the aerosol generating material 116 to a range of temperatures to volatilize at least one component of the aerosol generating material without combusting the aerosol generating material 116. For example, the temperature range may be about 50° C. to about 350° C., such as between about 100° C. and about 250° C., between about 150° C. and about 230° C. In some examples, the temperature range is between about 170° C. and about 220° C. In some examples, the temperature range may be other than this range, and the upper limit of the temperature range may be greater than 300° C.

Figure 2:
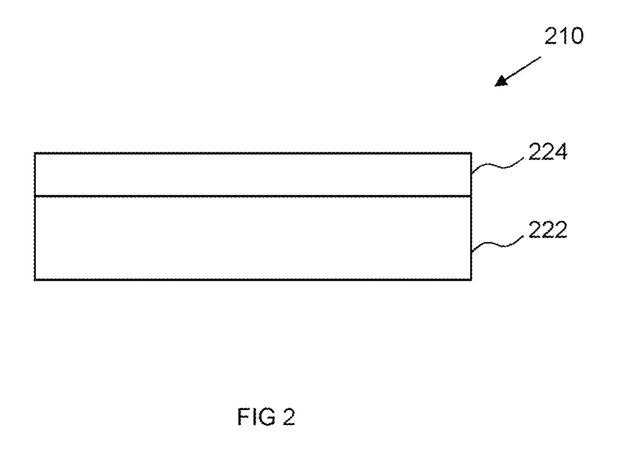
FIG. 2 illustrates schematically a composite susceptor according to a first example.

Referring now to FIG. 2, there is illustrated an example composite susceptor 210. The example composite susceptor 210 may be used as the composite susceptor 110 in the aerosol generating device 100 described with reference to FIG. 1. The composite susceptor 210 may be substantially planar (as illustrated in FIG. 2). In other examples, the composite susceptor 210 may be substantially tubular. For example, the composite susceptor 210 may surround the aerosol generating material (not shown in FIG. 2), i.e. the aerosol generating material may be placed inside the tubular composite susceptor 210. As another example, the aerosol generating material may be arranged around the tubular composite susceptor 210 so as to surround the tubular composite susceptor 210. The composite susceptor 210 being tubular may help improve heating efficiency of the aerosol generating material.

The composite susceptor 210 comprises a support portion 222 and a susceptor portion 224. The susceptor portion 224 is supported by the support portion 222 (that is the support portion 222 supports the susceptor portion 224). The susceptor portion 224 is capable of inductive energy transfer with the induction element (e.g. 106 of FIG. 1) such that an alternating magnetic field produced by the induction element causes the susceptor portion 224 to be inductively heated, for example by Joule heating and/or magnetic hysteresis heating as described above (i.e. the susceptor portion 224 acts as a susceptor in use). The susceptor portion 224 may comprise an electrically conductive material, such as metal, and/or a conductive polymer. The susceptor portion may comprise a ferromagnetic material, for example one or both of nickel and cobalt. In some examples, the support portion 222 may also substantially act as a susceptor. In other examples, the support portion 222 may substantially not be inductively heatable. The support portion 222 may comprise one or more of a metal, a metal alloy, a ceramics material, a plastics material, and paper. For example, the support portion 222 may be or comprise stainless steel, aluminum, steel, copper, and/or high temperature (i.e. heat resistant) polymers such as Polyether ether ketone (PEEK) and/or Kapton and/or polyamide resins such as Zytel® HTN.

The susceptor portion 224 may be formed as a coating on the support portion 222. For example, the susceptor portion 224 may be coated with a ferromagnetic material, for example nickel and/or cobalt. For example, the coating may be formed by chemical plating, for example electrochemical plating, and/or by vacuum evaporation of the material of the susceptor portion 224 onto the support portion 222. In some examples, the thickness of the susceptor portion 204 may be substantially no more than 50 microns, for example no more than 20 microns, for example between around 10 to 20 microns, for example around 15 microns or for example a few microns.

Figure 4:
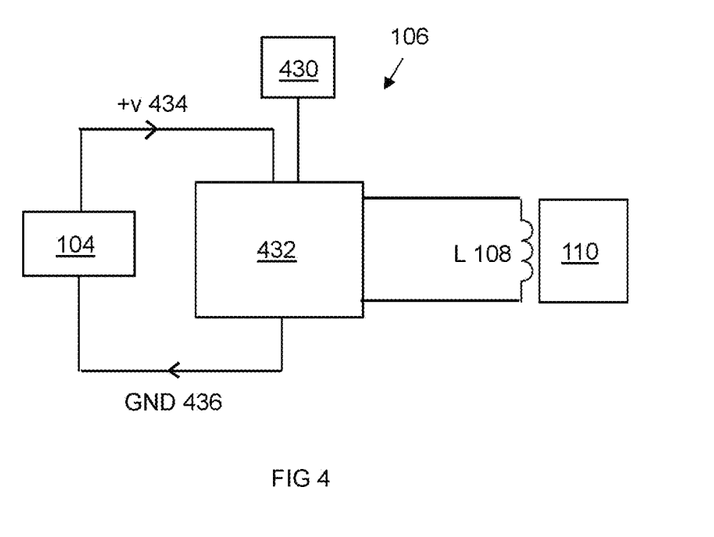
FIG. 4 illustrates schematically a portion of the aerosol generating apparatus of FIG. 1.

A composite susceptor 110 comprising a susceptor portion 204 of ferromagnetic material such as nickel or cobalt, (e.g. on a side of the composite susceptor 110 facing the induction element 108) may allow for the susceptor portion 204 to be made relatively thin while effecting a similar inductive energy absorption as a thicker mild steel plate, for example. Cobalt may be preferred as it has a higher magnetic permeability and hence may allow for improved inductive energy absorption. Further, cobalt has a higher Curie point temperature than nickel (around 1,120 to 1,127 degrees Celsius for cobalt, versus 353 to 354 degrees Celsius for nickel). At or towards the curie point temperature, magnetic permeability of the susceptor material may reduce or cease, and the ability of the material to be heated by penetration with a varying magnetic field may also reduce or cease. The curie point temperature of cobalt may be above the normal operating temperatures of the inductive heating of the aerosol generating device 100, and hence the effect of the reduced magnetic permeability may be less pronounced (or indiscernible) during normal operation if cobalt is used as compared to if nickel is used. As mentioned above, the support portion 222 of the composite susceptor 210 need not interact with the applied varying magnetic field to generate heat for heating the aerosol generating material 116, rather only to support the susceptor portion 222. Accordingly, the support can be made from any suitable heat resistant material. Example materials are aluminum, steel, copper, and high temperature polymers such as polyether ether ketone (PEEK), Kapton or paper.

Using a relatively low thickness of susceptor material, for example a ferromagnetic material such as nickel or cobalt may allow relatively little of the susceptor material to be used, which may allow for a more efficient/reduced cost susceptor production. Using relatively thin susceptor material alone may produce a susceptor prone to damage, for example due to the fragility of such materials at thicknesses in the range of 10s of microns. However, having the susceptor portion 224 supported by, for example formed as a coating on or being surrounded by, the support portion 222 may allow for a low cost susceptor to be produced but which is relatively resistant to damage. As mentioned above, since the support portion 222 need not necessarily provide the function of being susceptible to inductive heating, the support portion 222 may be made from a wider variety of heat resistant materials, such as a metal, a metal alloy, a ceramics material, and a plastics material, which may be of relatively low cost. Therefore, the composite susceptor 210 may be made with relatively low cost.

Referring now to FIG. 3, there is illustrated schematically an example composite susceptor 310. The example composite susceptor 210 may be used as the composite susceptor 110 in the aerosol generating device 100 described with reference to FIG. 1. The composite susceptor 310 illustrated in FIG. 3 may be the same as the example susceptor 210 described above with reference to FIG. 2, except that the composite susceptor 310 illustrated in FIG. 3 comprises a heat resistant protective portion 326. The composite susceptor 310 comprises a support portion 322 (which may be the same or similar to the support portion 222 of the composite susceptor 210 of FIG. 2), and a susceptor portion 324 (which may be the same or similar to the susceptor portion 224 of the composite susceptor 210 of FIG. 2). In this example, the susceptor portion 324 is located between the support portion 322 and the protective portion 326.

The heat resistant protective portion 326 may be a coating on the susceptor portion 324. The heat resistant protective portion 326 may comprise one or more of a ceramics material, metal nitride, titanium nitride, and diamond-like-carbon. For example, titanium nitride and/or diamond-like-carbon may be applied as a coating using physical vapor deposition. The protective portion 326 may protect the susceptor portion 324 from chemical corrosion, such as surface oxidation, which may otherwise have a propensity to occur, for example as a result of the inductive heating of the composite susceptor, and which may otherwise shorten the lifespan of the composite susceptor 310. The protective portion 326 may alternatively or additionally protect the susceptor portion 324 from mechanical wear, which may otherwise shorten the lifespan of the composite susceptor. The protective portion 326 may alternatively or additionally reduce the heat loss from the susceptor portion 324, which may otherwise be lost to the environment, and hence the protective portion 326 may improve the heating efficiency of the composite susceptor 310.

For example, where the susceptor portion 324 is of a ferromagnetic material such as cobalt or nickel, the susceptor portion 324 may become increasingly susceptible to oxidation as it increases in temperature. This may increase heat loss due to radiation by increasing the relative emissivity (εr) relative to the unoxidized metal surface, enhancing the rate at which energy is lost through radiation. If the energy radiated ends up being lost to the environment, then such radiation can reduce the system energy efficiency. Oxidation may also reduce the resistance of the susceptor portion 324 to chemical corrosion, which may result in shortening the service life of the heating element. The heat resistant protective portion 326 may reduce these effects. As mentioned above, in some examples, the protective portion 326 may be applied by physical vapor deposition, but in other examples the protective portion 326 may be provided by chemically treating the susceptor portion 324 to encourage growth of a protective film over the susceptor portion 324, or formation of a protective oxide layer using a process such as anodization. In some examples, the susceptor portion may be encapsulated, for example, the heat resistant protective portion 326 and the support portion 322 may together encapsulate the susceptor portion 224. In some examples, the heat resistant protective portion 326 may encapsulate the susceptor portion 324 and the support portion 322. In some examples, the heat resistant protective portion 326 may have low or no electrical conductivity, which may prevent the induction of electric currents in the heat resistant protective portion 326 rather than the susceptor portion 324.

FIG. 4 illustrates schematically in more detail some of the components of the apparatus 100 described above with reference to FIG. 1, according to an example. Components that are the same or similar to those described above with reference to FIG. 1 are given the same reference numerals and will not be described in detail again.

Referring to FIG. 4, the driving arrangement 106 comprises a driver 432 and a driver controller 430. The driver 432 is electrically connected to the battery 104. Specifically, the driver 432 is connected to a positive terminal of the battery 104, that provides relatively high electric potential +v 434, and to a negative terminal of the battery or to ground, which provides a relatively low or no or negative electric potential GND 436. A voltage is therefore established across the driver 432.

The driver 432 is electrically connected to the induction element 108. The induction element may have an inductance L. The driver 432 may be electrically connected to the induction element 108 via a circuit comprising a capacitor (not shown) having a capacitance C and the induction element 108 connected in series, i.e. a series LC circuit.

The driver 432 is arranged to provide, from an input direct current from the battery 104, an alternating current to the induction element 108 in use. The driver 432 is electrically connected to a driver controller 430, for example comprising logic circuitry. The driver controller 430 is arranged to control the driver 432, or components thereof, to provide the output alternating current from the input direct current. In one example, as described in more detail below, the driver controller 430 may be arranged to control the provision of a switching potential to transistors of the driver 432 at varying times to cause the driver 432 to produce the alternating current. The driver controller 430 may be electrically connected to the battery 104, from which the switching potential may be derived.

The driver controller 430 may be arranged to control the frequency of alternating current driven through the induction element 108. As mentioned above, LC circuits may exhibit resonance. The driver controller 208 may control the frequency of the alternating current driven through a series LC circuit comprising the induction element 108 to be at or near the resonant frequency of the LC circuit. For example, the drive frequency may be in the MHz (Mega Hertz) range, for example in the range 0.5 to 2.5 MHz for example 2 MHz. It will be appreciated that other frequencies may be used, for example depending on the particular circuit (and/or components thereof), and/or susceptor 110 used. For example, it will be appreciated that the resonant frequency of the circuit may be dependent on the inductance L and capacitance C of the circuit, which in turn may be dependent on the inductor 108, capacitor (not shown) and susceptor 110 used. It should be noted that in some examples, the capacitance may be zero or close to zero. In such examples, the resonant behavior of the circuit may be negligible.

The driving arrangement 106 may be arranged to control the waveform of the alternating current produced. In one example, as described in more detail below, the waveform may be a square wave form, for example a bi-polar square wave form. In other examples, the waveform may be a triangular waveform or a sawtooth waveform, or indeed any waveform comprising a fundamental frequency component having a first frequency and one or more further frequency components each having a frequency higher than the first frequency. In this regard, the fundamental frequency of the waveform is the drive frequency of the LC circuit.

In use, when the driver controller 430 is activated, for example by a user, the driver controller 430 may control the driver 432 to drive alternating current through the induction element 108, thereby inductively heating the susceptor 110 (which then may heat an aerosol generating material (not shown in FIG. 4) to produce an aerosol for inhalation by a user, for example).

Figure 5:
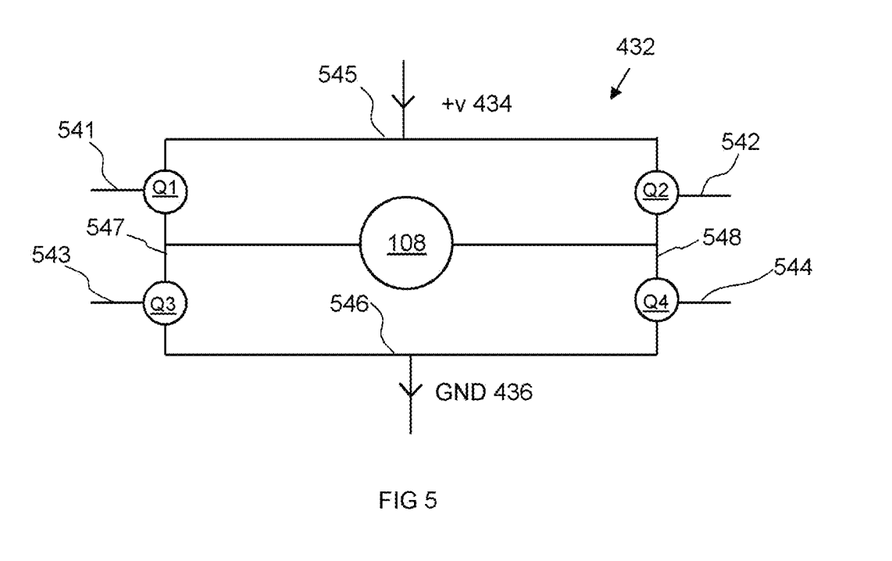
FIG. 5 illustrates schematically a portion of a driving arrangement according to an example.

Referring now to FIG. 5, there is illustrated schematically in more detail a driver 432 according to an example. The driver 432 illustrated in FIG. 5 may be used as the driver 432 described above with reference to FIG. 4, and/or may be used as part of the driving arrangement 106 described above with reference to FIGS. 1 and/or 4. In this example, the driver 432 is a H-bridge driver 432. The driver 432 comprises a plurality of transistors, in this example four transistors Q1, Q2, Q3, Q4, arranged in a H-bridge configuration (note that transistors arranged or connected in a H-bridge configuration may be referred to as a H-bridge). The H-bridge configuration comprises a high side pair transistors Q1, Q2 and a low side pair of transistors Q3, Q4. A first transistor Q1 of the high side pair is electrically adjacent to a third transistor Q3 of the low side pair, and a second transistor Q2 of the high side pair is electrically adjacent to a fourth transistor of the low side pair. The high side pair are for connection to a first electric potential +v 434 higher than a second electric potential GND 436 to which the low side pair are for connection. In this example, the driver 432 is arranged for connection of the DC power source 104 (not shown in FIG. 5) across a first point 545 between the high side pair 304 of transistors Q1, Q2 and a second point 546 between the low side pair 306 of transistors Q3, Q4. In use therefore, a potential difference is established between the first point 545 and the second point 546.

The example driver 432 illustrated in FIG. 5 is electrically connected to, and arranged to drive, the induction element 108. Specifically, the induction element 108 is connected across a third point 548 between one of the high side pair of transistors Q2 and one of the low side pair of transistors Q4 and a fourth point 547 between the other of the high side pair of transistors Q1 and the other of low side second pair of transistors Q3.

In this example, each transistor is a field effect transistor Q1, Q2, Q3, Q4 controllable by a switching potential provided by the driver controller (not shown in FIG. 5), via control lines 541, 542, 543, 544 respectively, to substantially allow current to pass therethrough in use. For example, each field effect transistor Q1, Q2, Q3, Q4 is arranged such that, when the switching potential is provided to the field effect transistor Q1, Q2, Q3, Q4 then the field effect transistor Q1, Q2, Q3, Q4, substantially allows current to pass therethrough, and when the switching potential is not provided to the field effect transistor Q1, Q2, Q3, Q4, then the field effect transistor Q1, Q2, Q3, Q4 substantially prevents current from passing therethrough.

In this example, the driver controller (not shown in FIG. 5, but see the driver controller 430 in FIG. 4) is arranged to control supply of the switching potential to each field effect transistor, via supply lines 541, 542, 543, 544 independently, thereby to independently control whether each respective transistor Q1, Q2, Q3, Q4 is in an "on" mode (i.e. low resistance mode where current passes therethrough) or an "off" mode (i.e. high resistance mode where substantially no current passes therethrough).

By controlling the timing of the provision of the switching potential to the respective field effect transistors Q1, Q2, Q3, Q4, the driver controller 430 may cause alternating current to be provided to the induction element 108. For example, at a first time, the driver controller 430 may be in a first switching state, where a switching potential is provided to the first and the fourth field effect transistors Q1, Q4, but not provided to the second and the third field effect transistors Q2, Q3. Hence the first and fourth field effect transistors Q1, Q4 will be in a low resistance mode, whereas second and third field effect transistors Q2, Q3 will be in a high resistance mode. Therefore, at this first time, current will flow from the first point 545 of the driver 432, through the first field effect transistor Q1, through the induction element 108 in a first direction (left to right in the sense of FIG. 5), through the fourth field effect transistor Q4 to the second point 546 of the driver 432. However, at a second time, the driver controller 430 may be in a second switching state, where a switching potential is provided to the second and third field effect transistors Q2, Q3, but not provided to the first and the fourth field effect transistors Q1, Q4. Hence the second and third field effect transistors Q2, Q3 will be in a low resistance mode, whereas first and fourth field effect transistors Q1, Q4 will be in a high resistance mode. Therefore, at this second time, current will flow from the first point 545 of the driver 432, through the second field effect transistor Q2, through the induction element 108 in a second direction opposite to the first direction (i.e. right to left in the sense of FIG. 5), through the third field effect transistor Q3 to the second point 546 of the driver 432. By alternating between the first and second switching state therefore, the driver controller 430 may control the driver 432 to provide (i.e. drive) alternating current through the induction element 108. In such a way, the driver arrangement 106 may therefore drive an alternating current through the induction element 108.

In this example, the alternating current driven through the induction element 108 may have a substantially square waveform. Specifically, the alternating current will have a substantially bi-polar square wave form (that is, the waveform of the alternating current has both a first substantially square portion for positive current values (i.e. current flowing in a first direction at the first time), and a second substantially square portion for negative current values (i.e. current flowing in a second direction opposite to the first direction at the second time). As described in more detail below however, in other example, other driving arrangements 106 may be used to produce alternating current having other forms. For example, the driving arrangement 106 may comprise a signal generator such as a function generator or an arbitrary waveform generator capable of generating one or more types of waveforms, which then may be used, for example with suitable amplifiers, to cause alternating current to be driven in the induction element 108 in accordance with that waveform.

Referring now to FIGS. 6a to 6j, FIGS. 6b, 6d, 6f, 6h, and 6j each illustrate schematically a plot in frequency space of the frequency components of the alternating current waveforms of FIGS. 6a, 6c, 6e, 6g, and 6i, respectively.

Figure 6A:
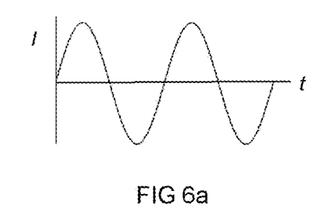
FIGS. 6a, 6c, 6e, 6g, and 6i each illustrate schematically a plot of current against time for different alternating current waveforms.
Figure 6B:
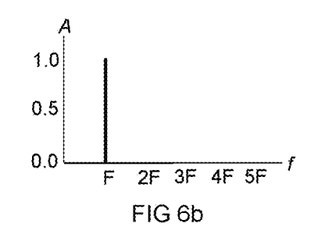
FIGS. 6b, 6d, 6f, 6h, and 6j each illustrate schematically a plot in frequency space of the frequency components of the alternating current waveforms of FIGS. 6a, 6c, 6e, 6g, and 6i, respectively.

FIG. 6a illustrates schematically a sine waveform of alternating current I as a function of time t. The sine waveform has a frequency F, in other words, in FIG. 6a, the current I varies as a function of time t according to the equation I=sin ($2\pi$Ft). FIG. 6b illustrates schematically a plot in frequency space of the frequency components of the sine waveform in FIG. 6a. In other words, the plot in FIG. 6b may be taken as representing the Fourier transform of the waveform of FIG. 6b. Specifically, FIG. 6b plots amplitude A of the waveform against frequency f. In the schematic plot of FIG. 6b, the amplitude A has been normalized so as to be 1 for the largest amplitude A of the spectrum. The plot of FIG. 6b illustrates that the pure sine waveform of FIG. 6a only has one frequency component at frequency F. In other words, all of the amplitude or energy of the sine waveform of FIG. 6a is contained at the frequency F, i.e. the fundamental frequency component of the waveform.

Figure 6C:
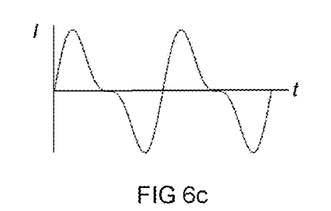
Figure 6D:
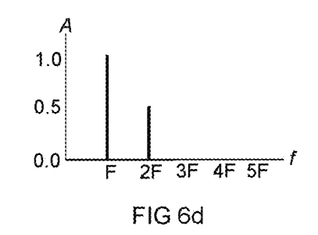

FIG. 6c illustrates schematically a plot of another example waveform of alternating current I as a function of time t. In this example, the waveform comprises a fundamental sine component having a frequency F, as well as a further sine component having frequency 2F. In other words, in FIG. 6c, the current I varies as a function of time t according to the equation I=sin ($2\pi$Ft)+B sin($2\pi$2Ft), where B is an arbitrary constant. FIG. 6d illustrates schematically a plot in frequency space (i.e. frequency f against amplitude A) of the frequency components of the waveform in FIG. 6c. Again, the amplitude A has been normalized so as to be 1 for the largest amplitude A of the spectrum. The plot of FIG. 6d illustrates that the waveform of FIG. 6c has a fundamental frequency component having a frequency F, and a further frequency component having a frequency of 2F. As illustrated, some of the amplitude or energy of the waveform of FIG. 6c is contained at the frequency F, i.e. the fundamental frequency component of the waveform, and some of the amplitude or energy of the waveform is contained at the frequency 2F (i.e. at a frequency two times that of F).

Figure 6E:
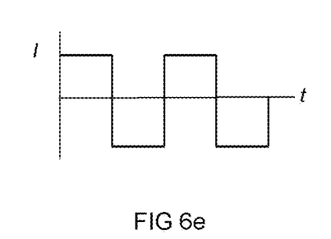
Figure 6F:
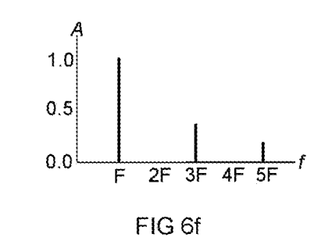

FIG. 6e illustrates schematically another example plot of a waveform of alternating current I as a function of time t. In this example, the waveform is a square waveform, specifically a bi-polar square waveform (i.e. where the waveform comprises a square portion of positive current flow followed by a square portion of negative current flow). In this example, the square waveform has a fundamental frequency F. As is known, the Fourier expansion of a square wave comprises a sum (in the ideal an infinite sum, but in practice not infinite) of sine waves, comprising the fundamental frequency component at frequency F, and further frequency components at odd integer k multiples of F, where the relative amplitudes of the frequency components are given by 1/k. For example, if the amplitude of the fundamental frequency component of frequency F is taken as 1, then the amplitude of the first further frequency component at frequency 3F would be ⅓, the amplitude of the second frequency component at frequency 5F would be ⅕, the amplitude of the third frequency component at frequency 7F would be ⅐, and so on. For case of reference, this series may be represented according to the convention (F)+⅓(3F)+⅕(5F)+⅐(7F)+ . . . . FIG. 6f illustrates schematically a plot in frequency space (i.e. frequency f against amplitude A) of the frequency components of the waveform in FIG. 6c. Again, the amplitude A has been normalized so as to be 1 for the largest amplitude A of the spectrum. The plot of FIG. 6f illustrates that, the square waveform comprises the fundamental frequency component having frequency F, as well as further frequency components at odd integer multiples (odd harmonics) of the fundamental frequency F, i.e. 3F, 5F, etc., having relative amplitudes represented as 1(F); ⅓(3F); ⅕(5F) etc. In other words, as illustrated, some of the amplitude or energy of the waveform of FIG. 6e is contained at the frequency F, i.e. the fundamental frequency component of the waveform; a third as much energy as in the fundamental frequency component is contained in the further frequency component at frequency 3F, and a fifth as much energy as in the fundamental frequency component is contained in the further frequency component at frequency 5F (and so on). In general, around 80% of the energy of the square wave form is contained within the fundamental frequency component, and around 20% of the energy of the square waveform is contained in the further frequency components of higher frequency.

Figure 6G:
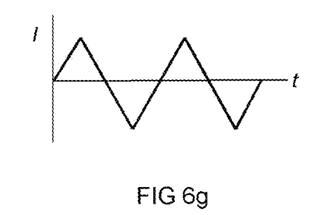
Figure 6H:
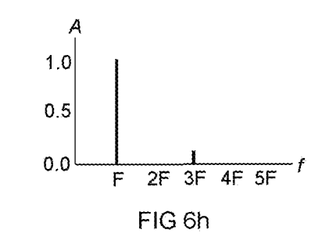

FIG. 6g illustrates schematically another example plot of a waveform of alternating current I as a function of time t. In this example, the waveform is a triangular waveform. In this example, the triangular waveform has a fundamental frequency F. As is known, the Fourier expansion of a triangular wave comprises a sum (in the ideal an infinite sum, but in practice not infinite) of sine waves, conforming to a sequence (in the form of the above introduced convention) of (F)−⅑(3F)+ 1/25(5F)− 1/49(7F)+ . . . . FIG. 6h illustrates schematically a plot in frequency space (i.e. frequency f against amplitude A) of the frequency components of the waveform in FIG. 6g. Again, the amplitude A has been normalized so as to be 1 for the largest amplitude A of the spectrum. The plot of FIG. 6h illustrates that, the triangular waveform comprises the fundamental frequency component having frequency F, as well as further frequency components at odd integer multiples (odd harmonics) of the fundamental frequency F, i.e. 3F, 5F, etc., having relative amplitudes represented as 1(F); ⅑(3F); ¹⁄₂₅(5F) etc. In other words, as illustrated, some of the amplitude or energy of the waveform of FIG. 6g is contained at the frequency F, i.e. the fundamental frequency component of the waveform; a ninth as much energy as in the fundamental frequency component is contained in the further frequency component at frequency 3F, and a 25th as much energy as in the fundamental frequency component is contained in the further frequency component at frequency 5F (and so on).

Figure 6I:
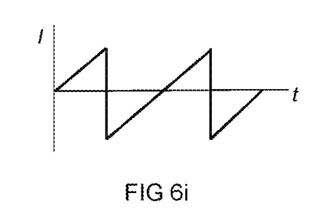
Figure 6J:
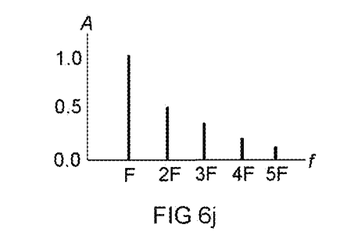

FIG. 6i illustrates schematically another example plot of a waveform of alternating current I as a function of time t. In this example, the waveform is a sawtooth waveform. In this example, the sawtooth waveform has a fundamental frequency F. As is known, the Fourier expansion of a sawtooth wave comprises a sum (in the ideal an infinite sum, but in practice not infinite) of sine waves, conforming to a sequence (in the form of the above introduced convention) of (F)−½(2F)+⅓(3F)−¼(4F)+ . . . . FIG. 6j illustrates schematically a plot in frequency space (i.e. frequency f against amplitude A) of the frequency components of the waveform in FIG. 6i. Again, the amplitude A has been normalized so as to be 1 for the largest amplitude A of the spectrum. The plot of FIG. 6j illustrates that, the sawtooth waveform comprises the fundamental frequency component having frequency F, as well as further frequency components at integer multiples (harmonics) of the fundamental frequency F, i.e. 2F, 3F, etc., having relative amplitudes represented as 1(F); ½(2F); ⅓(3F) etc. In other words, as illustrated, some of the amplitude or energy of the waveform of FIG. 6i is contained at the frequency F, i.e. the fundamental frequency component of the waveform; half as much energy as in the fundamental frequency component is contained in the further frequency component at frequency 2F, and a third as much energy as in the fundamental frequency component is contained in the further frequency component at frequency 3F (and so on).

Hence, in each of FIGS. 6c, 6e, 6g, and 6i, (e.g. square, triangular, sawtooth), the alternating current has a waveform comprising a fundamental frequency component having a first frequency (e.g. F) and one or more further frequency components each having a frequency higher than the first frequency. For example, the first frequency may be a frequency F in the range 0.5 MHz to 2.5 MHz, and the frequency of each of the one or more further frequency components may be nF, where n is a positive integer greater than 1. For example, in the case of the square waveform (or otherwise), n may be an odd positive integer greater than 1. For example, the first frequency F may be 2 MHz, and the frequency of the first further frequency component in the case of a square waveform (or otherwise) may be 3*2 MHz, i.e. 6 MHz. It will be appreciated that there are many example waveforms, other than the examples shown in FIGS. 6c, 6e, 6g, and 6i, which comprise a fundamental frequency component having a first frequency (e.g. F) and one or more further frequency components each having a frequency higher than the first frequency, which may be used instead. Nonetheless, it is noted that, among possible waveforms conforming to this criterion, the square waveform has a high proportion (around 20%) of its energy in higher order frequency components, and may therefore provide particular benefits in reducing the skin depth of the induced alternating current in the susceptor portion of the susceptor, as described in more detail below.

As mentioned above, the skin depth may be defined as a characteristic depth into which the alternating magnetic field produced by the induction element 108 penetrates into the susceptor portion to cause inductive heating. Specifically, the skin depth may be defined as the depth below the surface of the susceptor where the induced current density falls to 1/e (i.e. about 0.37) of its value at the surface of the susceptor. The skin depth is dependent on the frequency f of the induced current, and hence in turn dependent on the frequency of the alternating magnetic field produced by the induction element, and hence in turn dependent on the frequency of the alternating current driven through the induction element. For example, the frequency of the induced current may be the same as the frequency of the alternating current driven through the induction element. Specifically, skin depth δ may be given by:

$$\delta = \sqrt{\frac{2\rho}{2\pi f \mu}} \quad (1)$$

where ρ is the resistivity of the susceptor, f is the frequency of the induced current (which may be the same as the frequency of the alternating current driven through the induction element), and $\mu = \mu_r \mu_0$ where $\mu_r$ is the relative magnetic permeability of the susceptor and $\mu_0$ is the permeability of free space.

Driving the induction element with a current having a waveform comprising a fundamental frequency component having a first frequency and one or more further frequency components having a frequency higher than the first frequency, in turn causes the alternating magnetic field produced by the induction element to comprise a fundamental frequency component having the first frequency and the one or more further frequency components of having a frequency higher than the first frequency, which in causes the induced alternating current in the susceptor to comprise a fundamental frequency component having the first frequency and the one or more further frequency components of having a frequency higher than the first frequency. The further frequency components of the induced current are associated with a smaller skin depth than the fundamental frequency components of the induced current. Therefore, driving the induction element with an alternating current having a waveform comprising the fundamental frequency component and the one or more higher frequency components may therefore allow a greater proportion of the inductive energy transfer from the induction element to the susceptor to occur at relatively small distances from the surface of the induction element, for example as compared to using the fundamental frequency alone. This may allow advantages.

Figure 3:
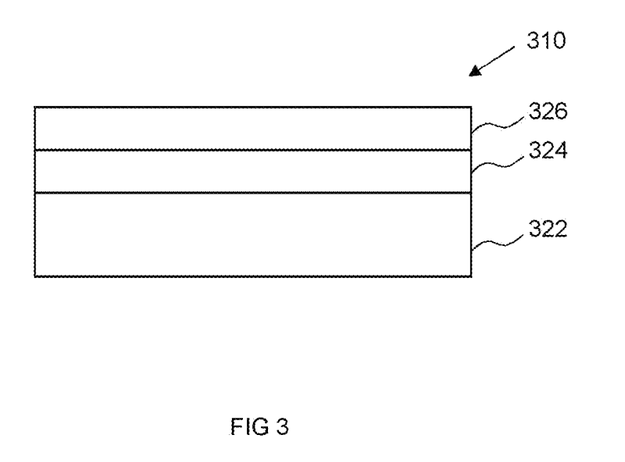
FIG. 3 illustrates schematically a composite susceptor according to a second example.

For example, having a greater proportion of the inductive energy transfer from the induction element to the susceptor occur at relatively small distances from the surface of the induction element may allow the thickness of susceptor portion 224, 324 to be reduced while still substantially maintaining a given inductive energy transfer efficiency. For example, an alternating current having a pure sine waveform of frequency F may have 100% of the inductive energy transfer occurring at frequency F, and hence may have a skin depth within which a given proportion of the inductive energy transfer takes place. However, for a square waveform alternating current having the same fundamental frequency F, around 20% of the inductive energy transfer is provided by the further frequency components of higher frequency (and hence lower associated skin depths), and hence the skin depth within which the given proportion of inductive energy transfer takes place will be reduced. Accordingly, the susceptor portion 224, 324 may be made thinner (as compared to for the case where the pure sine waveform is used), without reducing the given absorption efficiency. Accordingly, less material (for example ferromagnetic material, for example nickel or cobalt) may be used for the susceptor portion, which may in turn allow the cost of the susceptor portion to be reduced and/or the efficiency of producing the susceptor portion 224, 324 to be increased.

As another example, having a greater proportion of the inductive energy transfer from the induction element to the susceptor occur at relatively small distances from the surface of the induction element may allow the inductive energy transfer efficiency to be increased for a given susceptor portion thickness (for example one in which the skin depth might otherwise be larger than the thickness of the susceptor portion). For example, a given susceptor portion 224, 324 may have a given thickness. When a pure sine waveform alternating current of frequency F is used, the skin depth may be larger than the thickness of the susceptor portion 224, 324, and hence a relatively low inductive energy transfer may be achieved. However, for a square waveform alternating current having the same fundamental frequency F, around 20% of the inductive energy transfer is provided by the further frequency components of higher frequency (and hence lower associated skin depths), and hence there may be a relatively higher inductive energy transfer to the susceptor portion having the given thickness, and hence the efficiency of the inductive energy transfer to the susceptor portion 224, 324 may be relatively increased.

Figure 7:
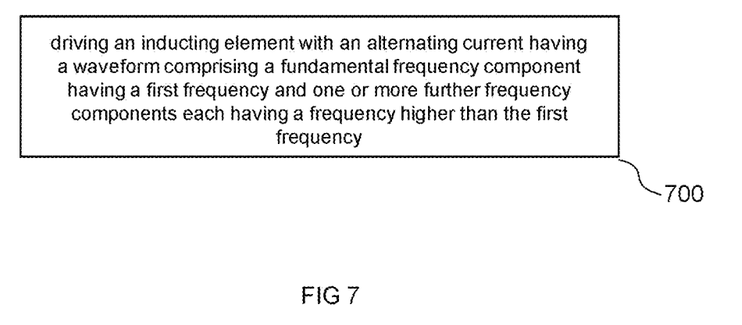
FIG. 7 illustrates schematically a method of operating an aerosol generating device, according to an example.

Referring to FIG. 7, there is illustrated an example method of operating an aerosol generating apparatus. For example, the aerosol generating apparatus may be the aerosol generating apparatus 100 described above with reference to any one of FIGS. 1 to 5. For example, the aerosol generating apparatus 100 may comprise a composite susceptor 110, 210, 310 arranged for heating an aerosol generating material 116 thereby to generate an aerosol. As described above, the composite susceptor may comprise a heat resistant support portion 222, 322 and a susceptor portion 224, 324 supported by the support portion 222, 322. For example, as described above, the support portion 222, 322 may be or comprise one or more of a metal such as stainless steel, aluminum, steel, copper; a metal alloy, a ceramics material, and a plastics material, and/or a high temperature (i.e. heat resistant) polymer such as Polyether ether ketone (PEEK) and/or Kapton. In some examples, the support portion may comprise paper. For example, as described above, the susceptor portion 224, 324 may be or comprise a ferromagnetic material, for example nickel or cobalt, for example formed as a coating on the support structure, for example having a thickness of less than 50 microns, for example less than 20 microns, for example between 10 and 20 microns, or for example a few microns. The apparatus may further comprise an induction element 108 arranged for inductive energy transfer to at least the susceptor portion 224, 324 of the composite susceptor 210.

The method comprises, in step 700, driving the induction element 108 with an alternating current thereby to cause the inductive energy transfer to the susceptor portion 224, 324, thereby to cause the heating of the aerosol generating material 116 by the composite susceptor 110, 210, 310, thereby to generate the aerosol; wherein the alternating current has a waveform comprising a fundamental frequency component having a first frequency (F) and one or more further frequency components each having a frequency higher than the first frequency (F). For example, as described above, the one or more further frequency components may be harmonics of the fundamental frequency component (i.e. having frequencies of integer multiples of the fundamental frequency), for example odd harmonics (i.e. having frequencies of odd integer multiples of the fundamental frequency. For example, as described above, the waveform may be one of a triangular waveform, a sawtooth waveform, and a square waveform. For example, as described above, the waveform may be a bi-polar square waveform. The driving the induction element with the alternating current may be performed by a driver arrangement, for example, the driver arrangement 106 described above with reference to any one of FIGS. 1 to 6, which may for example comprise transistors in a H-bridge arrangement controlled so as to produce a driving current having a square waveform, as described above.

In a similar way to as described above, the method may provide for the cost of the susceptor portion 224, 324 to be reduced while still substantially maintaining a given inductive energy transfer efficiency (and hence aerosol generation efficiency), and/or allow for an improved inductive energy transfer efficiency (and hence aerosol generation efficiency) for a given susceptor portion 224, 324 thickness.

According to the above examples therefore, an improved aerosol generating device and method for producing an aerosol may be provided.

In the above described examples, an induction element 108 is driven with alternating current having a waveform (e.g. a square waveform) comprising a fundamental frequency component and one or more higher frequency components (e.g. harmonics), to cause inductive energy transfer to a susceptor portion 223, 324 of a composite susceptor 110, 210, 310, the composite susceptor 110, 210, 310 comprising the susceptor portion 224, 324 and a support portion supporting the susceptor portion 224, 324. Some benefits of this arrangement are discussed above. However, the following is also noted:

Since the support portion 222 supports the susceptor portion 224, 324, the susceptor portion 224 may be made thin (e.g. 50 microns, for example no more than 20 microns, for example between around 10 to 20 microns, for example around 15 microns or for example a few microns) because the susceptor portion 224, 324 need not support itself. Having a thin susceptor portion 224, 324 may allow numerous benefits. For example, the mass of the susceptor portion 224, 324 may be relatively small and hence the susceptor portion 224, 324 may heat up relatively quickly for a given inductive energy transfer, and hence in turn the heat up rate of the aerosol generating material may be increased, which may provide for more responsive heating performance and/or for improved overall energy efficiency. As another example, the amount of susceptor portion 224 material may be relatively small, thereby saving costs of the susceptor material. As another example, the thickness of the susceptor portion 224, 324 may be relatively small, which may allow the time and costs associated with manufacturing the susceptor portion 224, 324, for example by deposition, chemical and/or electrochemical plating, and/or vacuum evaporation, to be reduced. As another example, for manufacturing of the susceptor portion by deposition or evaporation for example, the morphology of the deposited susceptor portion layer may worsen with increasing thickness of the layer, and hence having a thin susceptor portion 224, 324 may allow for the overall quality of the layer to be relatively high, which may allow for example for improved performance.

Therefore, the composite susceptor 110, 210, 310 allows for use of relatively thin susceptor portions 224, 324, which may have benefits as above. However, relatively thin susceptor portions 224, 324 could in principle have the drawback that the efficiency of inductive energy transfer from the induction element 108 to the relatively thin susceptor portion 224, 324 may be relatively small. For example, as described above, this may be because the skin depth (the characteristic depth into which the alternating magnetic field produced by the induction element 108 penetrates the susceptor portion to cause inductive heating) may be larger than the thickness of the susceptor portion 224, 324, meaning that the coupling efficiency of the inductive energy transfer from the induction element 108 to the susceptor portion 224, 324 may be relatively low. However, this potential drawback of composite susceptors 110, 210, 310 may be addressed, as per the examples described herein, by driving the induction element 108 with alternating current having a waveform comprising a fundamental frequency component and one or more higher frequency components (e.g. harmonics). Since the skin depth decreases with increasing frequency, the higher frequency components may help ensure that, for the relatively thin susceptor portion 224, 324 of the composite susceptor 110, 210, 310, a relatively high coupling efficiency of the inductive energy transfer from the induction element 108 to the susceptor portion 224, 324 may nonetheless be achieved. This may be achieved for example without increasing the fundamental frequency of the driving alternating current. As described above, of such waveforms, the square waveform, such as the bi-polar square wave form, has a particularly high proportion of its energy in higher frequency components, and hence may allow for particularly high coupling efficiency to the susceptor portion 224, 324 of the composite susceptor 110, 210, 310. Moreover, as described, the square waveform, for example bi-polar square waveform, may be generated using a relatively inexpensive and uncomplicated driver arrangement 432.

Therefore, the combination of the composite susceptor 110, 210, 310 and the driving of the induction element with an alternating current having a waveform (e.g. a square waveform) comprising a fundamental frequency component and one or more higher frequency components, may allow for reduction of costs for example while helping to ensure a relatively high energy transfer efficiency, and hence may allow for an improved aerosol generating device and method.

Though in certain examples described above the susceptor portion of the composite susceptor comprises a coating on the support portion, in other examples the susceptor portion and the support portion may each comprise a sheet of material. The support portion may be separable from the susceptor portion. The support portion may then abut the susceptor portion to support the susceptor portion, e.g. the support portion may surround the susceptor portion. For example, the susceptor portion may comprise a first sheet of a material configured to be wrapped around the aerosol generating material while the support portion comprises a second sheet of material configured to be wrapped around the first sheet to support the first sheet. In one such example, the support portion is formed of paper. The susceptor portion may be formed of any suitable material for generating heat due to the alternating magnetic field. For example, the susceptor portion may comprise aluminum.

The above examples are to be understood as illustrative examples of the invention. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

What is claimed is:

1. A composite susceptor for heating an aerosol generating material in use thereby to generate an aerosol in use, wherein the composite susceptor comprises a support portion and a susceptor portion supported by the support portion, wherein the susceptor portion is formed as a coating on the support portion,
wherein the composite susceptor comprises a heat resistant protective portion, wherein the heat resistant protective portion is a coating on the susceptor portion, wherein the support portion is substantially not inductively heatable and wherein the susceptor portion is located between the support portion and the protective portion.

2. The composite susceptor according to claim 1, wherein the susceptor portion comprises a first sheet of material and the support portion comprises a second sheet of material configured to abut the susceptor portion to support the susceptor portion.

3. The composite susceptor according to claim 1, wherein the susceptor portion has a thickness of substantially no more than 50 microns.

4. The composite susceptor according to claim 1, wherein the susceptor has a thickness of substantially no more than 20 microns.

5. The composite susceptor according to claim 1, wherein the susceptor portion comprises a ferromagnetic material.

6. The composite susceptor according to claim 1, wherein the susceptor portion comprises one or more of nickel, cobalt and aluminium.

7. The composite susceptor according to claim 1, wherein the support portion comprises one or more of a metal, a metal alloy, a ceramics material, a plastics material, and paper.

8. The composite susceptor according to claim 1, wherein the support portion is made from a heat resistant material.

9. The composite susceptor according to claim 1, wherein the heat resistant protective portion comprises one or more of a ceramics material, metal nitride, titanium nitride, and diamond.

10. The composite material according to claim 1, wherein the susceptor portion is encapsulated by the heat resistant protective portion.

11. The composite susceptor according to claim 1, wherein the composite susceptor is substantially planar.

12. The composite susceptor according to claim 1, wherein the composite susceptor is substantially tubular.

13. The composite susceptor according to claim 1, further comprising the aerosol generating material, wherein the aerosol generating material is in thermal contact with the composite susceptor.

14. The composite susceptor according to claim 13, wherein the aerosol generating material comprises tobacco and/or one or more humectants.

15. A method of operating a composite susceptor according to claim 1 arranged for heating an aerosol generating material thereby to generate an aerosol, the composite susceptor comprising a support portion and a susceptor portion supported by the support portion, wherein the susceptor portion is formed as a coating on the support portion, wherein the composite susceptor comprises a heat resistant protective portion, wherein the heat resistant protective portion is a coating on the susceptor portion, wherein the support portion is substantially not inductively heatable, and wherein the susceptor portion is located between the support portion and the protective portion, the method comprising:
    causing inductive energy transfer from an induction element to the susceptor portion, thereby to cause the heating of the aerosol generating material by the composite susceptor, thereby to generate the aerosol.

16. The method of claim 15, further comprising driving said induction element with an alternating current thereby to cause said inductive energy transfer.

17. The method of claim 16, wherein the alternating current has a waveform comprising a fundamental frequency component having a first frequency and one or more further frequency components each having a frequency higher than the first frequency.

* * * * *